(12) United States Patent
Horiuchi et al.

(10) Patent No.: US 10,777,156 B2
(45) Date of Patent: Sep. 15, 2020

(54) DISPLAY DRIVING DEVICE AND DISPLAY DEVICE HAVING ELECTRIC POTENTIAL CONTROLLING CIRCUITRY

(71) Applicant: SHARP KABUSHIKI KAISHA, Sakai, Osaka (JP)

(72) Inventors: Satoshi Horiuchi, Sakai (JP); Seijirou Gyouten, Sakai (JP); Sachio Tsujino, Sakai (JP); Isao Ogasawara, Sakai (JP); Yoshihiro Asai, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/117,441

(22) Filed: Aug. 30, 2018

(65) Prior Publication Data
US 2019/0073973 A1    Mar. 7, 2019

(30) Foreign Application Priority Data
Sep. 1, 2017    (JP) .................................. 2017-168546

(51) Int. Cl.
*G09G 3/36*    (2006.01)
*G02F 1/133*    (2006.01)
*G02F 1/1362*    (2006.01)

(52) U.S. Cl.
CPC ....... *G09G 3/3648* (2013.01); *G02F 1/13306* (2013.01); *G02F 1/136286* (2013.01); *G09G 3/3677* (2013.01); *G09G 2310/0286* (2013.01); *G09G 2310/08* (2013.01)

(58) Field of Classification Search
CPC ......... G09G 3/3648; G09G 2310/0286; G09G 2310/08; G09G 3/20; G09G 3/3674; G09G 3/3677; G02F 1/13306; G02F 1/136286
See application file for complete search history.

(56) References Cited

U.S. PATENT DOCUMENTS

| 2014/0267156 | A1  | 9/2014 | Koga et al. |
| 2015/0030116 | A1  | 1/2015 | Horiuchi et al. |
| 2016/0118011 | A1* | 4/2016 | Park ..................... G09G 3/3688 345/58 |

(Continued)

FOREIGN PATENT DOCUMENTS

| CN | 107068088 A * | 8/2017 |
| CN | 107068088 A   | 8/2017 |

(Continued)

*Primary Examiner* — Temesghen Ghebretinsae
*Assistant Examiner* — Ivelisse Martinez Quiles
(74) *Attorney, Agent, or Firm* — ScienBiziP, P.C.

(57) ABSTRACT

A gate driving circuit includes circuits each provided in such a manner as to, as a scanning signal, select a single clock pulse of a clock signal and output the clock pulse. The circuits each include: a transistor for outputting a scanning signal; a transistor for controlling an electric potential of a gate of the transistor so that the electric potential of the gate is at a low level; a transistor for, while the transistor is not outputting the scanning signal, controlling an electric potential of a gate of the transistor so that the electric potential of the gate is at a high level; and a transistor for, while the transistor is not in operation during a period during which an operation of the selection circuit is paused, controlling the electric potential of the gate of the transistor so that the electric potential becomes high.

9 Claims, 13 Drawing Sheets

(56) References Cited

U.S. PATENT DOCUMENTS

2016/0307641 A1 10/2016 Zheng et al.
2017/0039987 A1* 2/2017 Yao .......................... G09G 3/30

FOREIGN PATENT DOCUMENTS

| JP | 2014-182203 A | 9/2014 |
| WO | 2013/137069 A1 | 9/2013 |
| WO | 2017/006815 A1 | 1/2017 |

* cited by examiner

--PRIOR ART--

—PRIOR ART—

—PRIOR ART—

DISPLAY DRIVING DEVICE AND DISPLAY DEVICE HAVING ELECTRIC POTENTIAL CONTROLLING CIRCUITRY

This Nonprovisional application claims priority under 35 U.S.C. § 119 on Patent Application No. 2017-168546 filed in Japan on Sep. 1, 2017, the entire contents of which are hereby incorporated by reference.

TECHNICAL FIELD

The present invention relates to a display driving device configured to drive a display panel.

BACKGROUND ART

An active matrix liquid crystal display device includes a liquid crystal display panel including (i) a plurality of signal lines and (ii) a plurality of scanning lines. Such a liquid crystal display device, to drive a liquid crystal display panel, sequentially selects the scanning lines with use of a gate driver, and for each selected scanning line, allows pixel signals supplied from a source driver to be written through respective signal lines into respective pixels connected to the selected scanning line.

A gate driver includes a shift register as disclosed in Patent Literatures 1 and 2, and is configured to, by sequentially shifting an inputted shift signal to a subsequent stage in synchronization with a clock signal, output pulse signals (scanning signals) each for selecting a scanning line.

CITATION LIST

Patent Literature

[Patent Literature 1]
Japanese Patent Application Publication, Tokukai, No. 2014-182203 (Publication Date: Sep. 29, 2014)
[Patent Literature 2]
International Publication No. WO2017/006815 (Publication Date: Jan. 12, 2017)

SUMMARY OF INVENTION

Technical Problem

Patent Literatures 1 and 2 each disclose a liquid crystal display device including a liquid crystal display panel with which a touch panel is integrated. Such a liquid crystal display device is configured such that the operation of the shift register is stopped a plurality of times during a single frame for a detection process by the touch panel.

The shift register includes, for example, a plurality of transfer circuits as illustrated in FIG. 15 that are cascade-connected to one another. The transfer circuits are configured such that each transfer circuit uses, as a reset signal, a scanning signal Out(n+3) outputted from the transfer circuit three stages after and, as a set signal, a scanning signal Out(n−2) outputted from the transfer circuit two stages before. The transfer circuits are each configured to cause the transistors TFTb and TFTc to operate with use of a clock signal CK4 to control the operation of the transistor TFTa and thus output a scanning signal Out(n) on the basis of a clock signal CK1.

As illustrated in FIG. 16, when the clock signal CK1 changes from low to high, the parasitic capacitance Cp of the transistor TFTa causes the electric potential of the node Na to rise. At this stage, the clock signal CK4 causes the transistor TFTb to be turned on, and thus the electric potential of the node Nb is high via the transistor TFTb. This causes the voltage VGL to be applied to the node Na via the transistor TFTc, with the result of the node Na having an electric potential stabilized to the voltage VGL.

During the pause period Ti, the supply of the clock signals CK1 to CK4 (among which the clock signal CK2 is unused for the above transfer circuits) is stopped so that the operation of the shift register, that is, the scanning operation of each transfer circuit transferring a scanning signal, is paused. When the clock signal CK1 changes from low to high immediately after the pause period Ti, the clock signal CK4 is at a low level. This makes it impossible to control the rise of the electric potential of the node Na as in the scanning period. This causes the transistor TFTa to be turned on, and thus the clock signal CK1 is leaked as a scanning signal Out(n), with the result of the gate driver malfunctioning.

Patent Literature 1 discloses an example of supplying each transfer circuit with an electric potential retaining signal Pulse for retaining the electric potential of the shift signal during a period of break of the clock signals as illustrated in FIG. 17. The transfer circuits are each configured such that since the electric potential retaining signal Pulse is at a high level during a pause period, the electric potential of the node Na cannot be maintained at a low level due to electric charge leaked from the transistors TFTa and TFTb and is changed toward a high level. As described above, in a state where the node Na has a high electric potential, the gate driver easily malfunctions when a clock signal CK has caused the electric potential of the node Na to rise.

It is an object of an embodiment of the present invention to prevent a gate driving circuit from malfunctioning during a pause period.

Solution to Problem

In order to attain the above object, a display driving device in accordance with an aspect of the present invention includes a plurality of selection circuits each provided for a corresponding one of a plurality of scanning lines in such a manner as to, as a scanning signal for selecting the corresponding one of the plurality of scanning lines so as to allow a pixel signal to be supplied to a corresponding one of a plurality of pixels connected to the corresponding one of the plurality of scanning lines, select a single clock pulse of a clock signal and output the clock pulse, the selection circuits each including: an output transistor configured to output the scanning signal; an electric potential controlling transistor configured to control an electric potential of a control terminal of the output transistor so that the electric potential of the control terminal of the output transistor is at a low level; a first high electric potential controlling circuit configured to, while the output transistor is not outputting the scanning signal, control an electric potential of a control terminal of the electric potential controlling transistor so that the electric potential of the control terminal of the electric potential controlling transistor is at a high level; and a second high electric potential controlling circuit configured to, while the first high electric potential controlling circuit is not in operation during a pause period during which an operation of the selection circuit is paused, control the electric potential of the control terminal of the electric potential controlling transistor so that the electric potential of the control terminal of the electric potential controlling transistor becomes high.

Advantageous Effects of Invention

An embodiment of the present invention advantageously prevents a gate driving circuit from malfunctioning.

Figure 3:
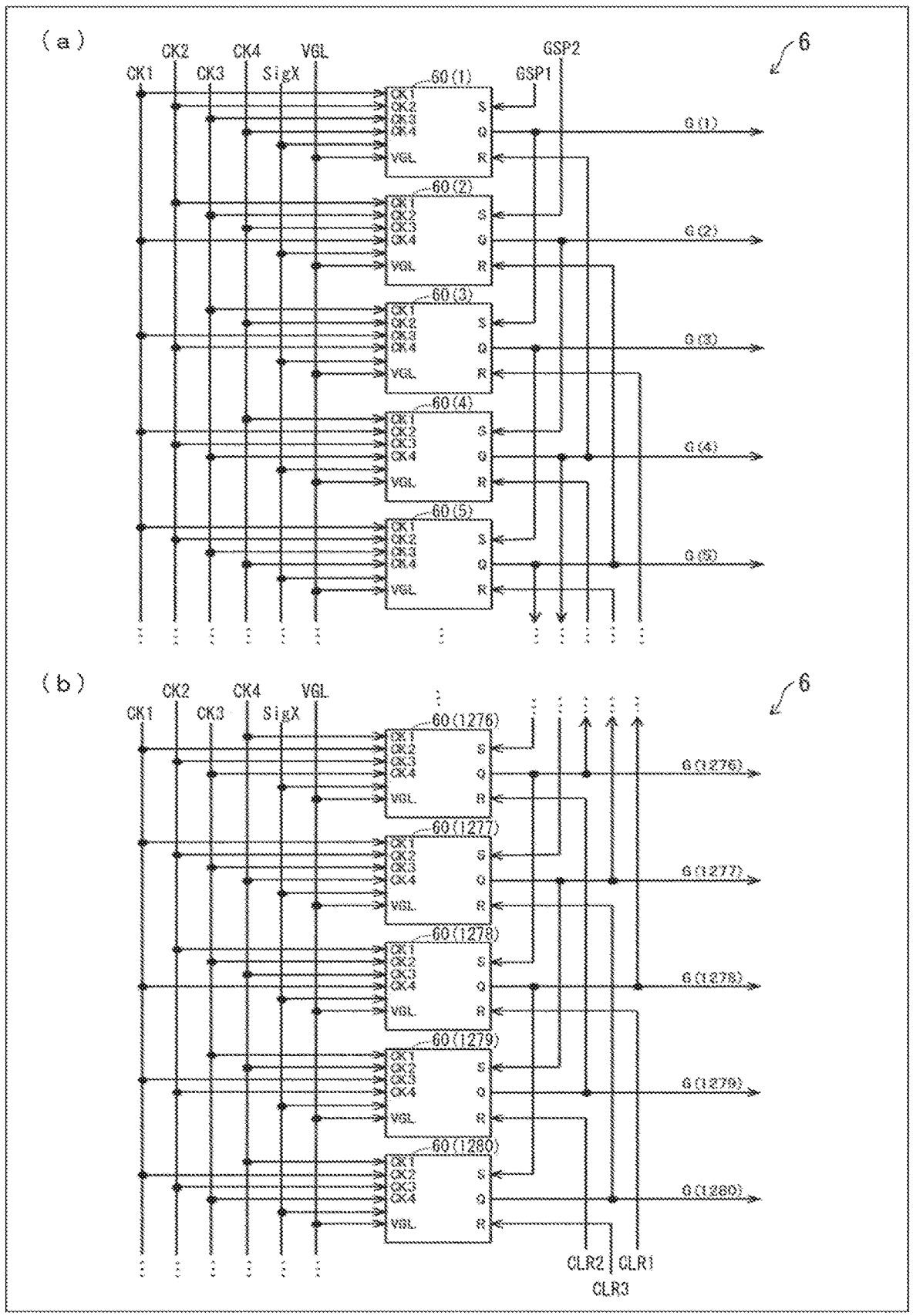

(a) and (b) of FIG. 3 are each a circuit diagram illustrating the configuration of a gate driving circuit included in the liquid crystal display device.

Figure 4:
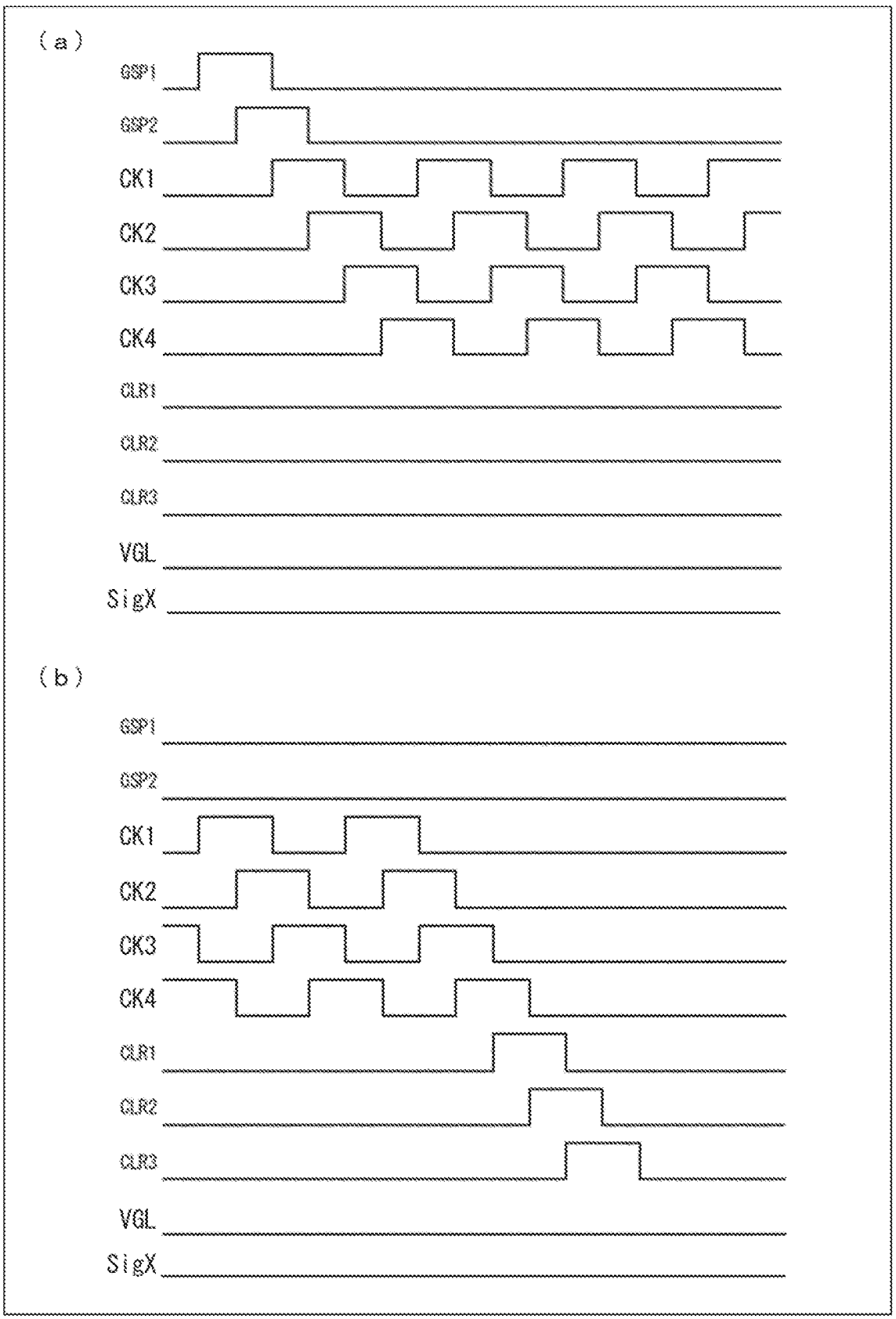

(a) and (b) of FIG. 4 are each a timing chart illustrating how the gate driving circuit operates.

Figure 5:
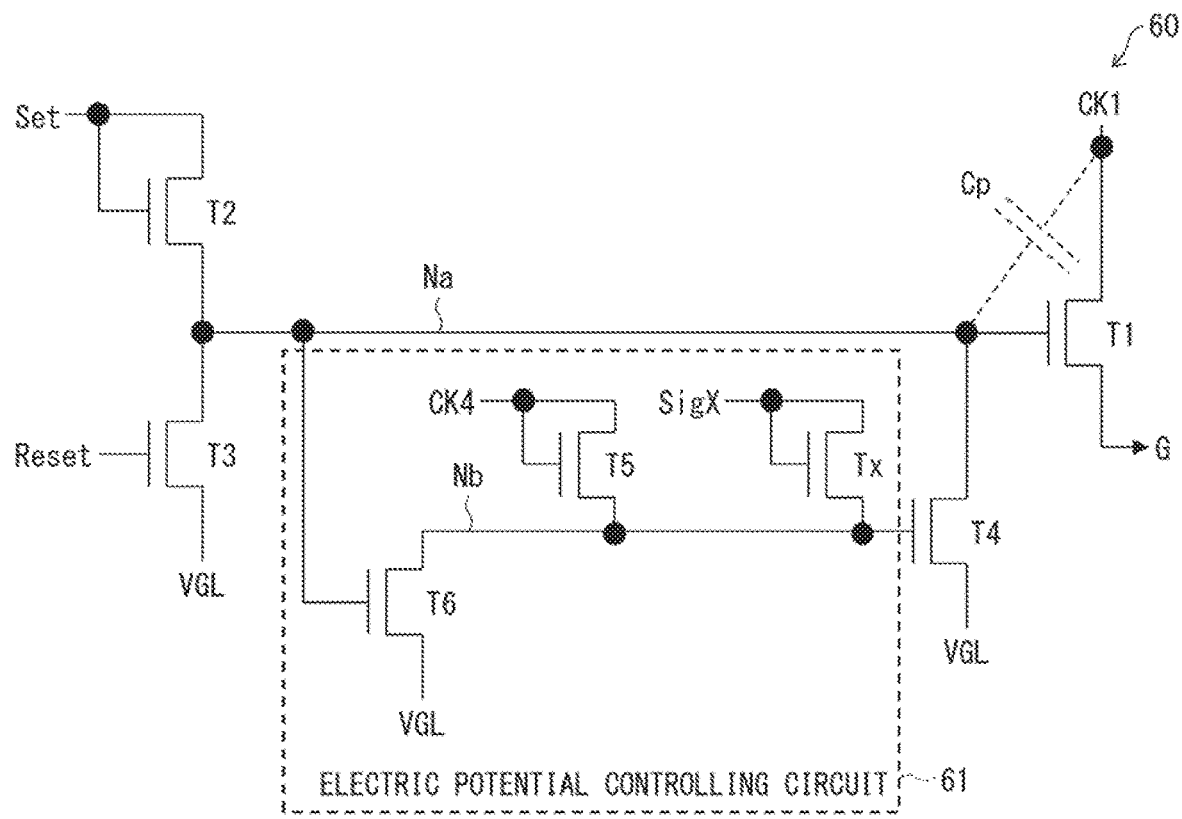

FIG. 5 is a circuit diagram illustrating the configuration of a selection circuit included in the gate driving circuit.

Figure 6:
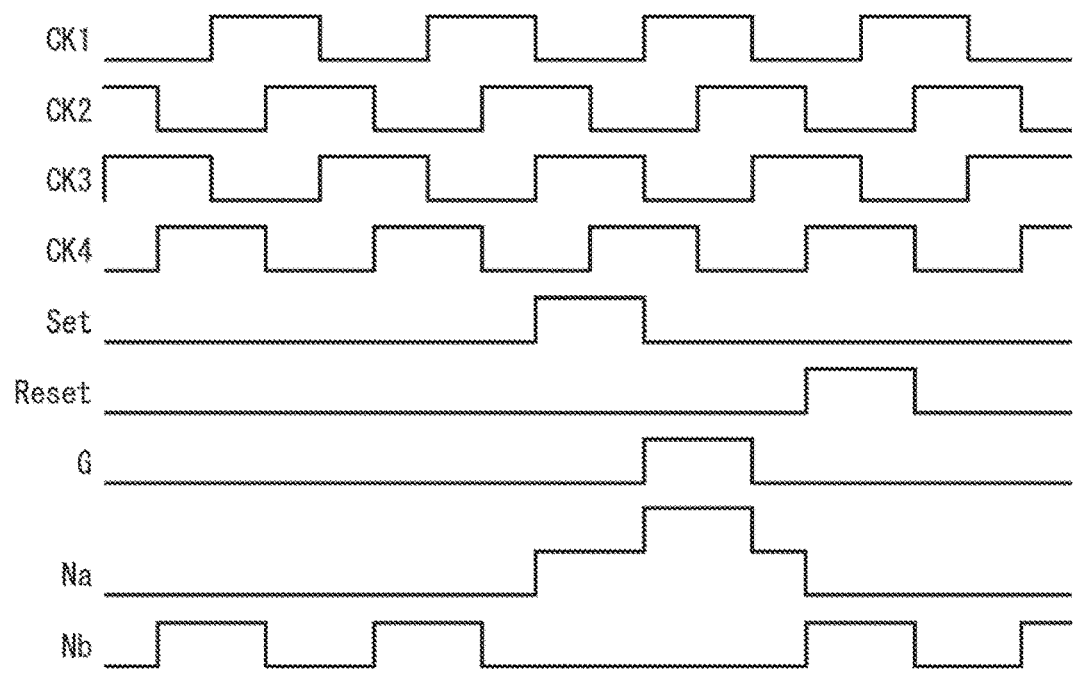

FIG. 6 is a timing chart illustrating how the selection circuit operates for normal scanning.

Figure 7:
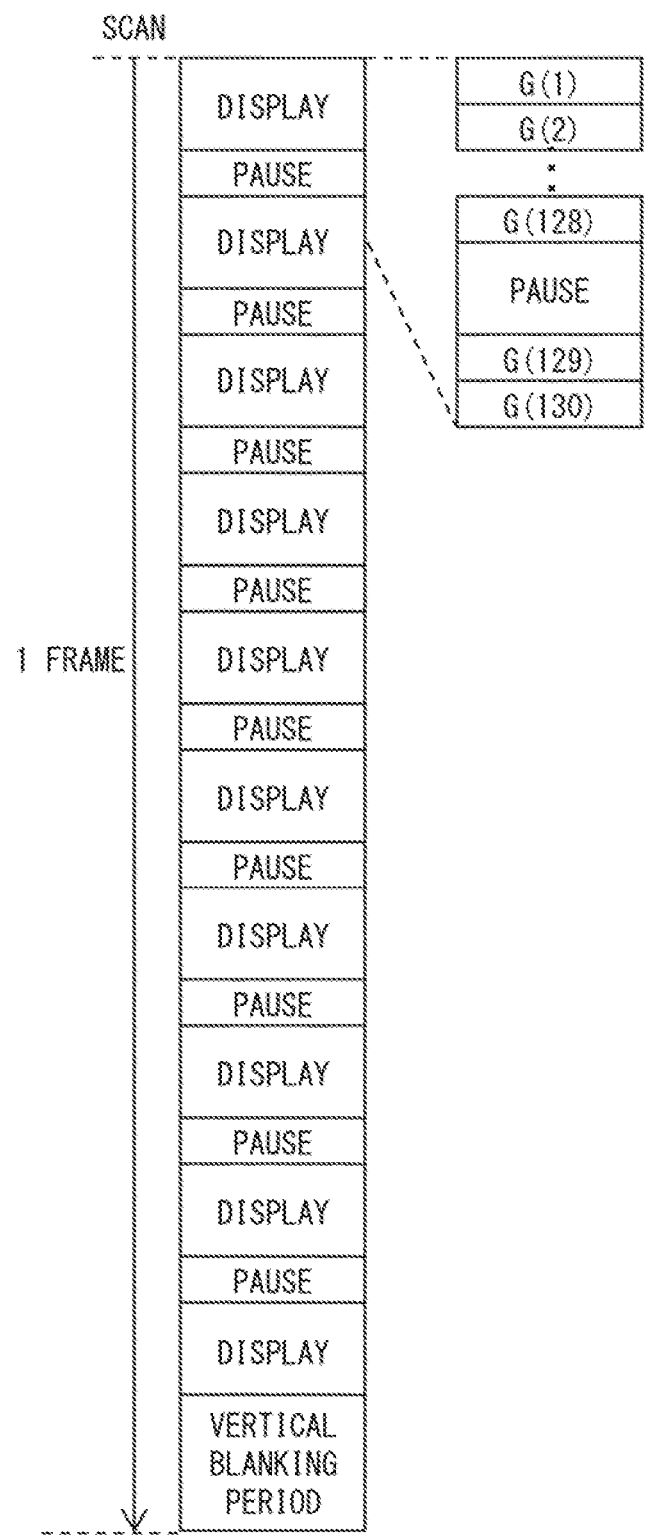

FIG. 7 is a diagram illustrating how periods of display operation and periods of pause of the display operation are allocated for the selection circuit during a single frame.

Figure 8:
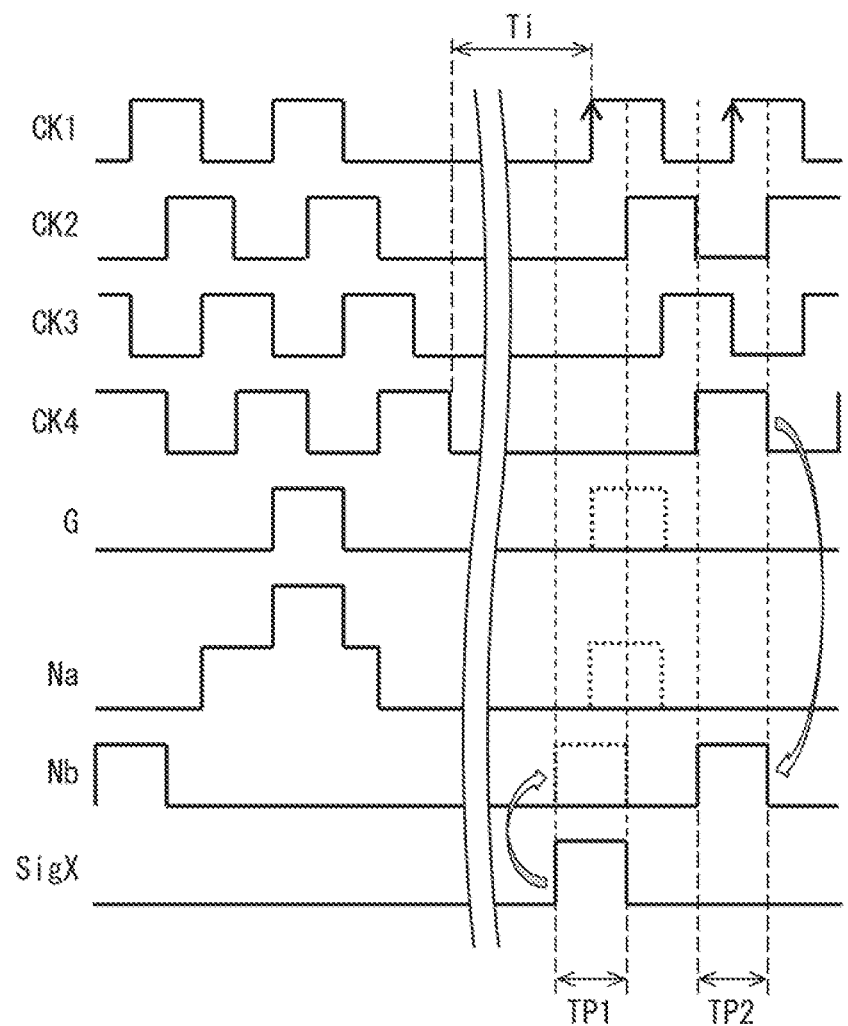

FIG. 8 is a timing chart illustrating an operation of the selection circuit which operation includes a pause period.

Figure 9:
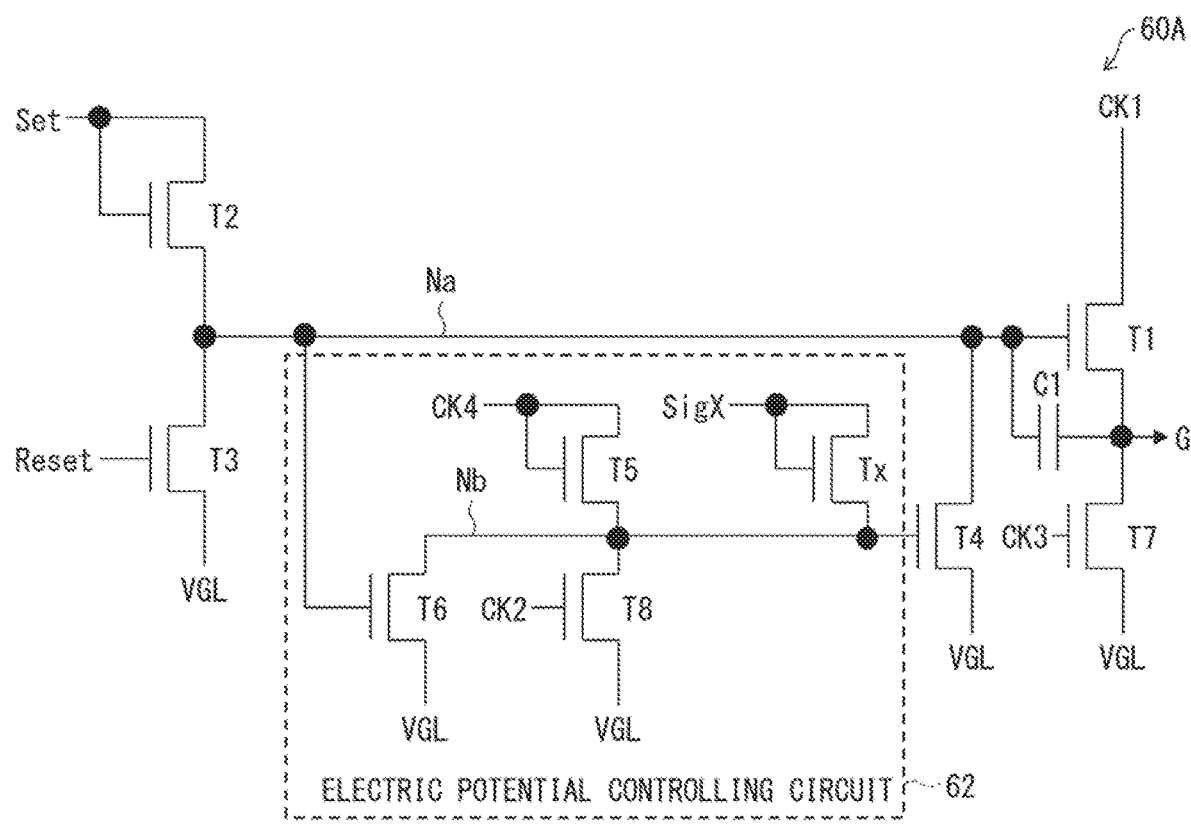

FIG. 9 is a circuit diagram illustrating the configuration of a selection circuit in accordance with Variation 1 of Embodiment 1.

Figure 10:
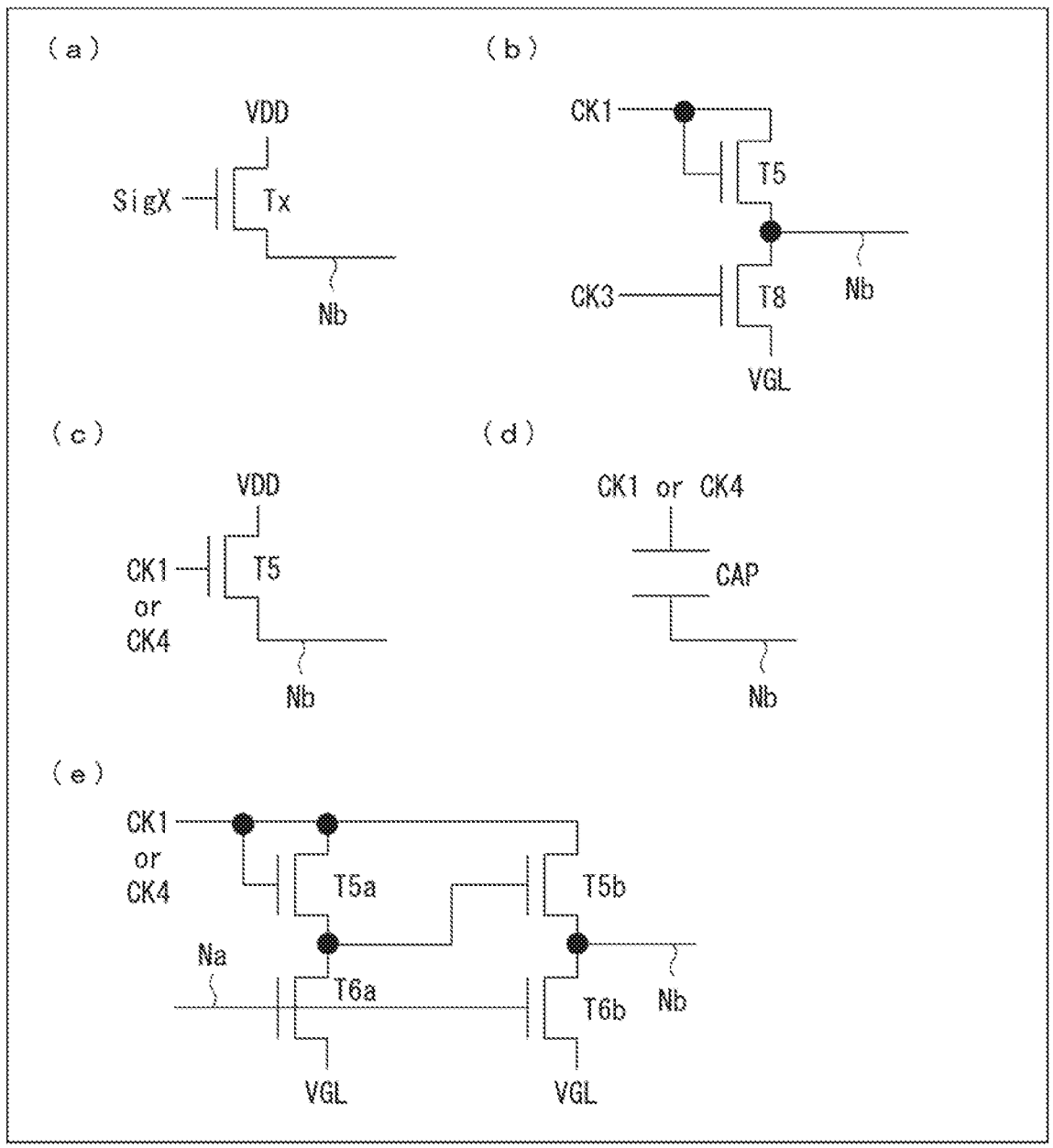

(a) to (e) of FIG. 10 are each a circuit diagram illustrating the configuration of a modified portion of an electric potential controlling circuit in a selection circuit in accordance with Variation 2 of Embodiment 1.

Figure 11:
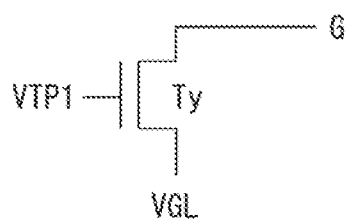

FIG. 11 is a circuit diagram illustrating the configuration of a modified portion of an electric potential controlling circuit in a selection circuit in accordance with Embodiment 2 of the present invention.

Figure 12:
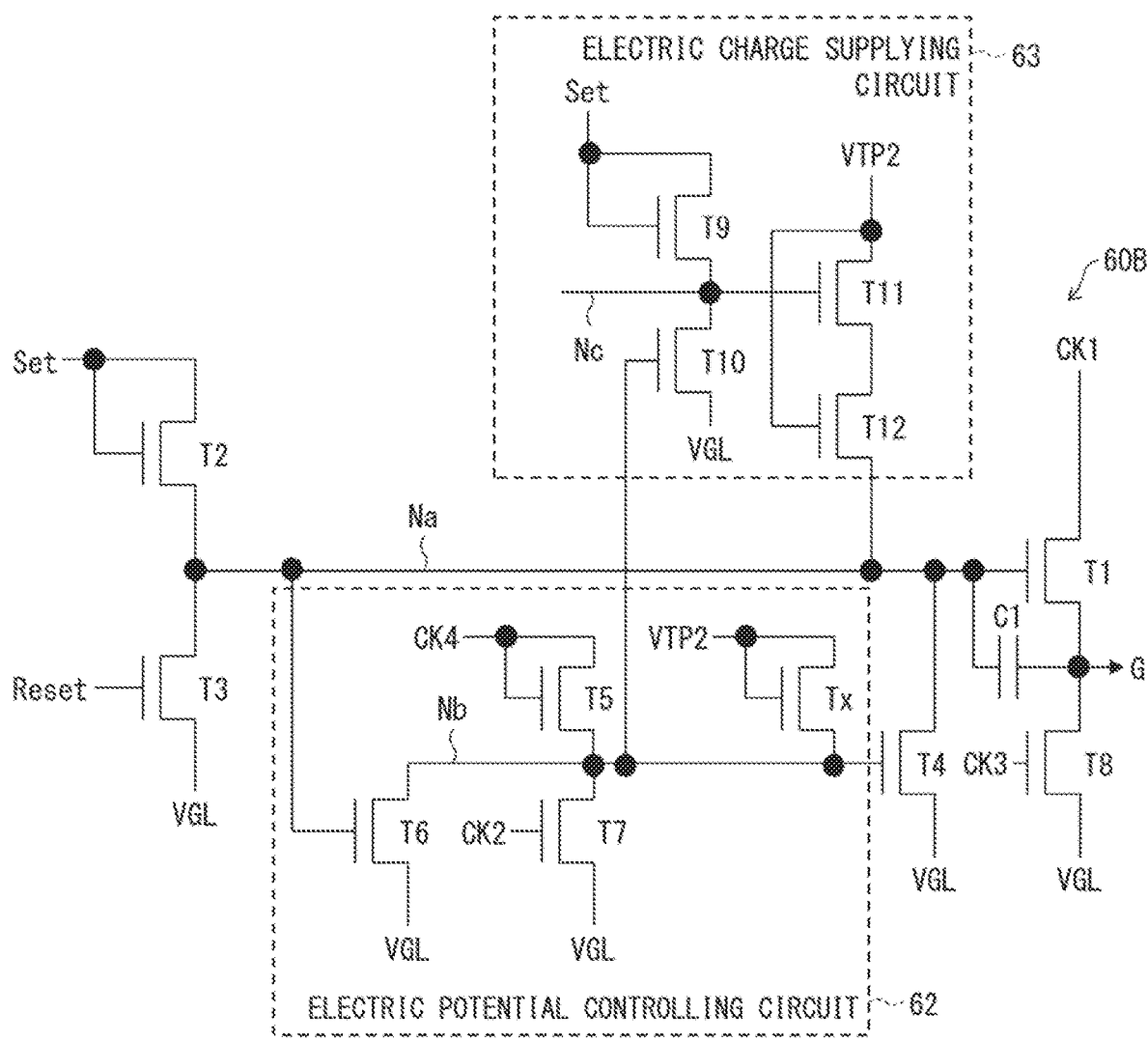

FIG. 12 is a circuit diagram illustrating the configuration of another selection circuit in accordance with Embodiment 2 of the present invention.

Figure 13:
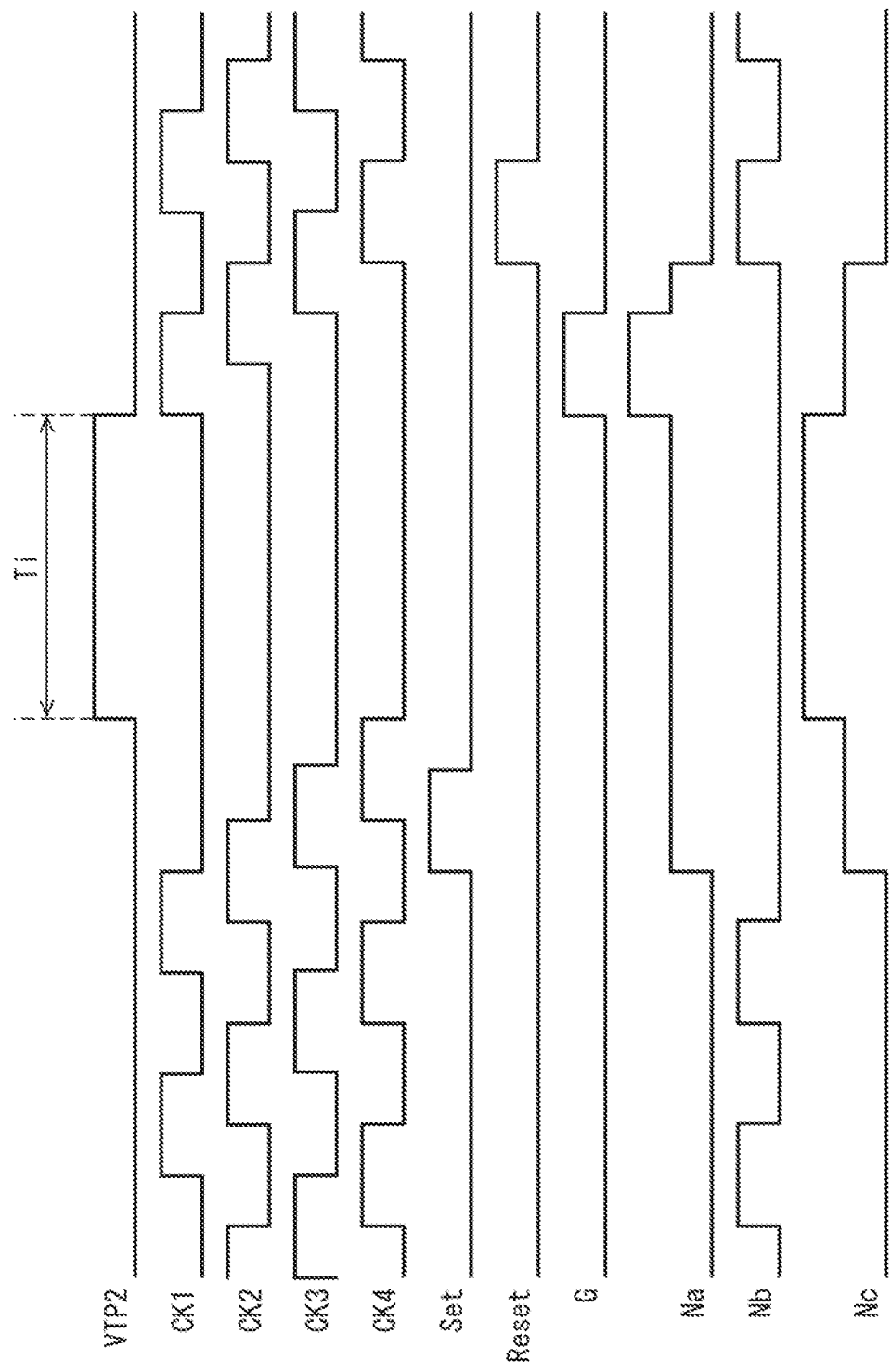

FIG. 13 is a timing chart illustrating how the selection circuit illustrated in FIG. 12 operates.

Figure 14:
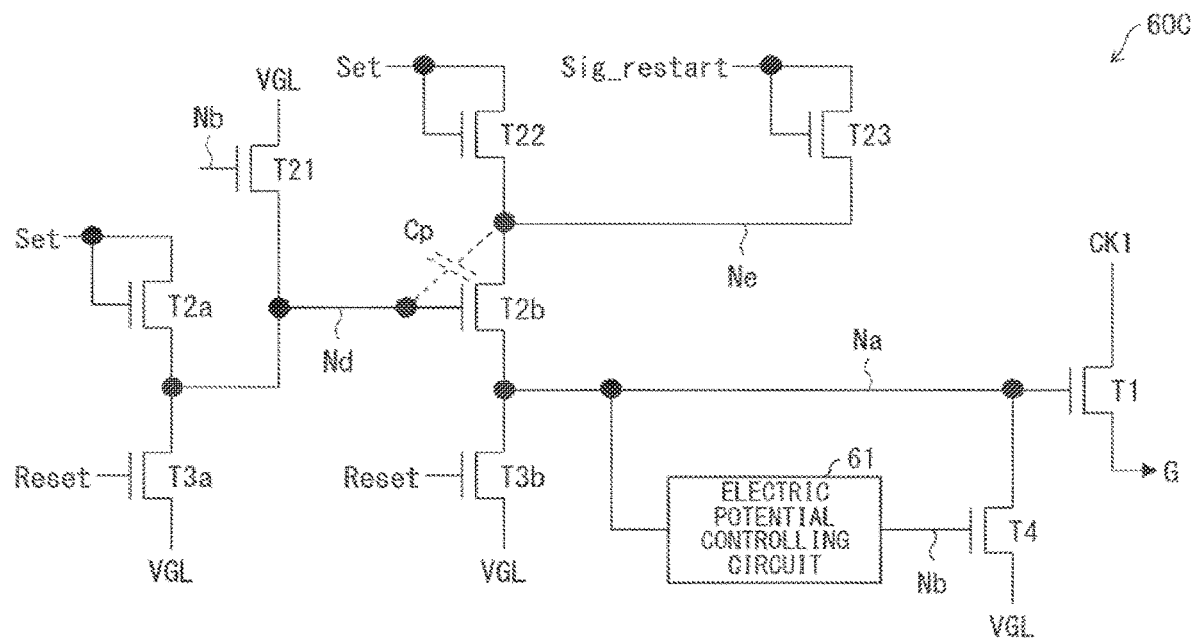

FIG. 14 is a circuit diagram illustrating the configuration of a selection circuit in accordance with Embodiment 3 of the present invention.

Figure 15:
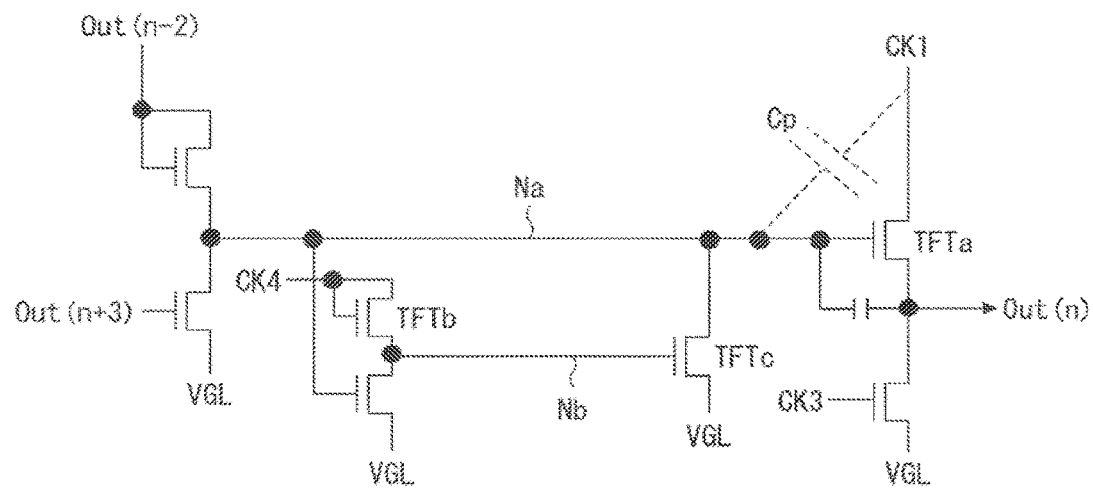

FIG. 15 is a circuit diagram illustrating the configuration of a conventional selection circuit.

Figure 16:
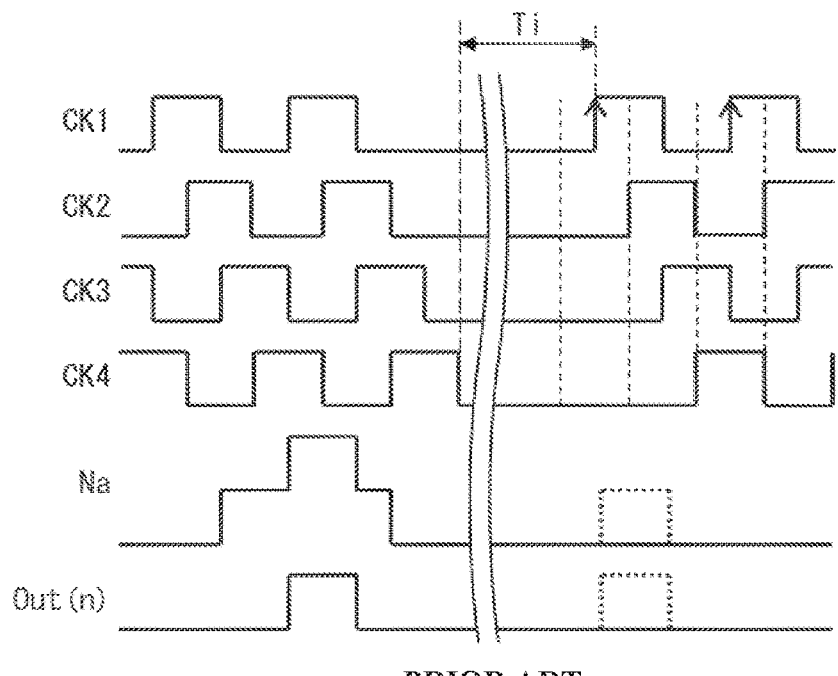

FIG. 16 is a timing chart illustrating how the selection circuit illustrated in FIG. 15 operates.

Figure 17:
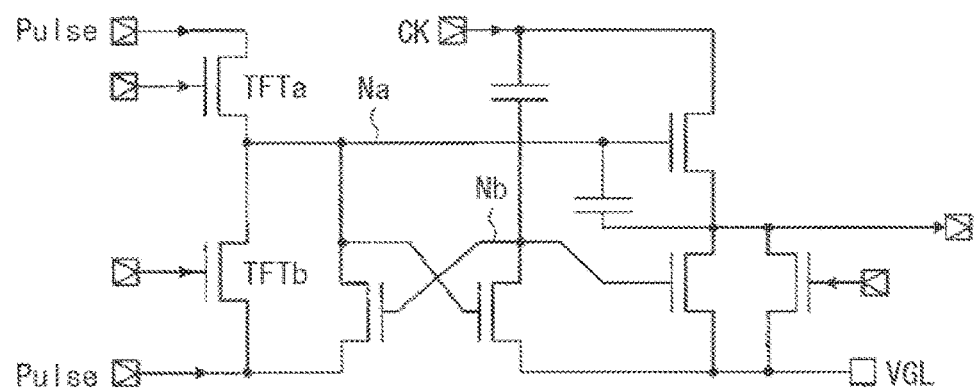

FIG. 17 is a circuit diagram illustrating the configuration of another conventional selection circuit.

DESCRIPTION OF EMBODIMENTS

Embodiment 1

The following description will discuss Embodiment 1 of the present invention with reference to FIGS. 1 to 10.

Figure 1:
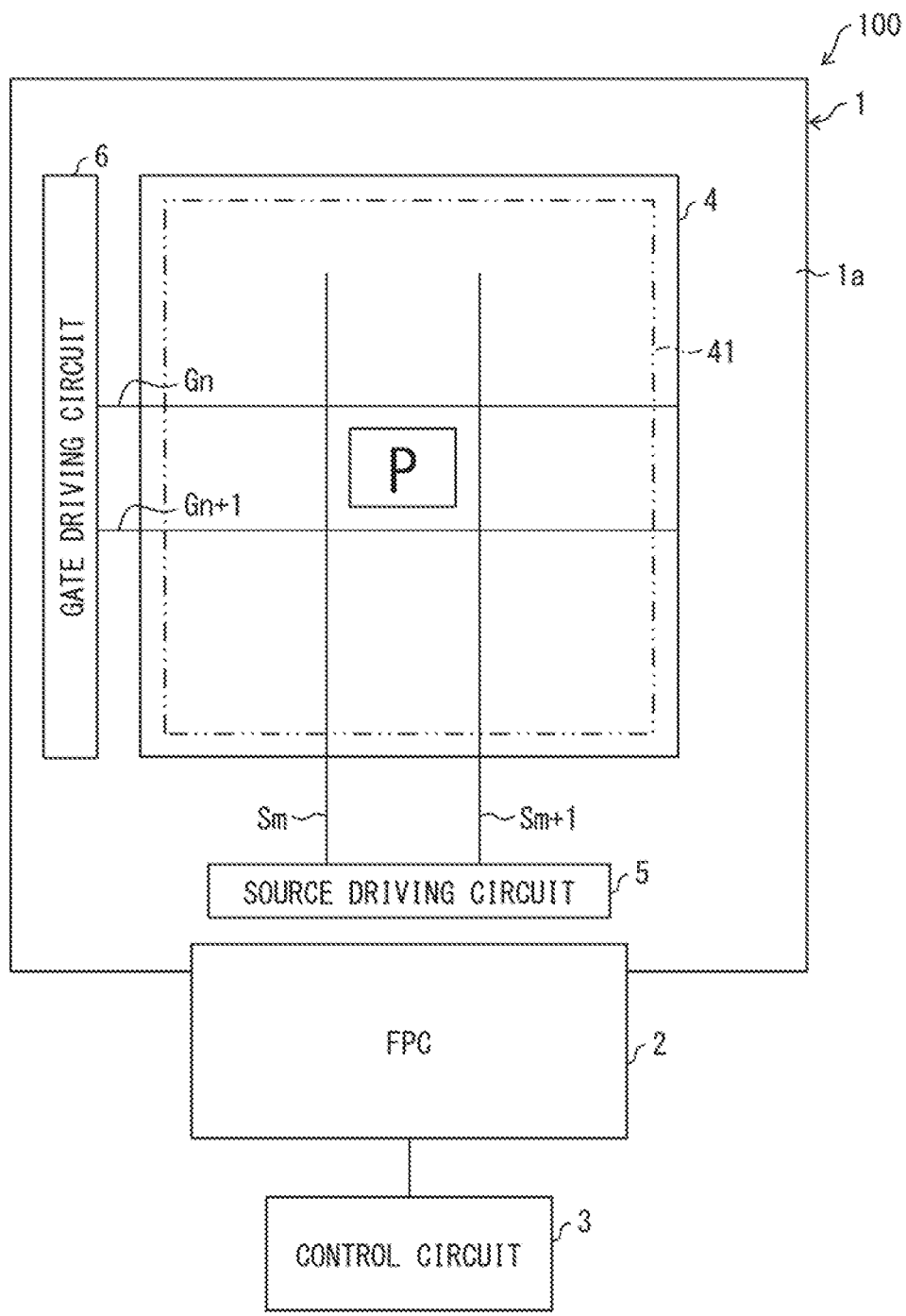
FIG. 1 is a block diagram illustrating the overall configuration of a liquid crystal display device in accordance with Embodiment 1 of the present invention.
Figure 2:
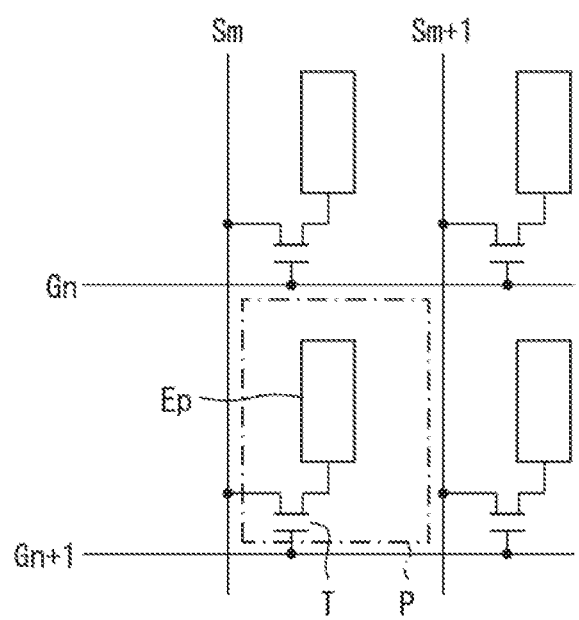
FIG. 2 is a circuit diagram illustrating the configuration of pixels of the liquid crystal display device.

The description below first deals with the configuration of a liquid crystal display device 100 with reference to FIGS. 1 and 2. FIG. 1 is a block diagram illustrating the overall configuration of the liquid crystal display device 100. FIG. 2 is a circuit diagram illustrating the configuration of pixels of the liquid crystal display device 100. (a) and (b) of FIG. 3 are each a circuit diagram illustrating the configuration of a gate driving circuit 6 included in the liquid crystal display device 100. (a) and (b) of FIG. 4 are each a timing chart illustrating how the gate driving circuit 6 operates.

As illustrated in FIG. 1, the liquid crystal display device 100 (display device) includes a liquid crystal display panel 1, a flexible wiring (flexible printed circuit) board 2, and a control circuit 3. The control circuit 3 is connected to the liquid crystal display panel 1 via the flexible wiring board 2.

The liquid crystal display panel 1 is of an active matrix type, and controls the respective orientations of liquid crystal molecules with use of thin film transistors (TFTs) T illustrated in FIG. 2. The liquid crystal display panel 1 includes a display section 4, a source driving circuit 5 (pixel signal supplying device), and a gate driving circuit 6 (display driving device).

The display section 4, the source driving circuit 5, and the gate driving circuit 6 are present on an active matrix substrate 1a. The display section 4 is constituted by the active matrix substrate 1a, a counter substrate (not shown), and liquid crystal sandwiched between the active matrix substrate 1a and the counter substrate. The display section 4 includes a large number of pixels P arranged in a matrix. There are present on the active matrix substrate 1a a plurality of signal lines S (Sm, Sm+1, . . . ) and a plurality of scanning lines G (Gn, Gn+1, . . . ), the plurality of signal lines S and the plurality of scanning lines G crossing each other. The source driving circuit 5 includes integrated driver chips, and is mounted on the active matrix substrate 1a in COG (chip on glass) form. The gate driving circuit 6 includes TFT elements on the active matrix substrate 1a.

The display section 4 includes a touch panel 41. The touch panel 41 is an in-cell touch panel, that is, a touch panel incorporated in the display section 4. The touch panel 41 may alternatively be a separate component unincorporated in the display section 4.

As illustrated in FIG. 2, the signal lines S extend parallel to one another in a column direction (vertical direction), whereas the scanning lines G extend parallel to one another in a row direction (horizontal direction). There are provided a thin film transistor T and a pixel electrode Ep in correspondence with each intersection of a signal line S and a scanning line G. Each thin film transistor T has (i) a source electrode connected to a signal line S, (ii) a gate electrode connected to a scanning line G, and (iii) a drain electrode connected to a pixel electrode Ep. Each pixel electrode Ep and a common electrode form a liquid crystal capacitance therebetween. Each pixel P is constituted by a thin film transistor T, a pixel electrode Ep, the common electrode, and a liquid crystal capacitance.

With the above configuration, in a case where a scanning signal supplied to the scanning line G for a pixel P has turned on the gate of the thin film transistor T, and a pixel signal from the signal line S has been written into the pixel electrode Ep, an electric potential corresponding to the pixel signal is supplied to the pixel electrode Ep. This causes a voltage corresponding to the pixel signal to be applied between the pixel electrode Ep and the common electrode, thereby making it possible to control the respective orientations of liquid crystal molecules and thus carry out a gradation display corresponding to the pixel signal.

The liquid crystal display panel 1 configured as above is driven by the source driving circuit 5 and the gate driving circuit 6. The control circuit 3 supplies the source driving circuit 5 and the gate driving circuit 6 with various control signals necessary to drive the liquid crystal display panel 1.

The source driving circuit 5 outputs pixel signals to each of the signal lines S. The pixel signals are generated by the source driving circuit 5, which (i) receives video signals supplied from the outside of the liquid crystal display device 100 via the control circuit 3 and then (ii) allocates the video signals to the individual columns and causes the video signals to be subjected to processes such as boosting.

The gate driving circuit 6 outputs scanning signals each for selecting a scanning line G to be activated. The gate driving circuit 6 shifts a start pulse from the control circuit 3 sequentially to a subsequent stage to output, to respective scanning lines G at different stages, scanning signals at respective time points shifted from one another.

As illustrated in (a) and (b) of FIG. 3, the gate driving circuit 6 includes a plurality of selection circuits 60 to output the above scanning signals. The selection circuits 60 are each provided for a corresponding one of the scanning lines G in such a manner as to, as a scanning signal for selecting the corresponding one of the plurality of scanning lines G so as to allow a pixel signal to be supplied to a corresponding one of a plurality of pixels P connected to the corresponding scanning line G, select a single clock pulse of the clock signal CK1 and output the clock pulse. The selection circuits 60 each select a single clock pulse of the clock signal CK1 by transmitting information on the timing of a start pulse to a selection circuit 60 at a subsequent stage.

(a) and (b) of FIG. 3 show the reference numeral "60" followed by numbers in parentheses which numbers each indicate the ordinal stage of the corresponding selection circuit 60. (a) of FIG. 3 illustrates the configuration of the first selection circuit 60 and its neighboring selection circuits 60, whereas (b) of FIG. 3 illustrates the configuration of the last selection circuit 60 and its neighboring selection circuits 60. (a) and (b) of FIG. 3 illustrate how the gate driving circuit 6 is configured to include 1280 selection circuits 60.

The selection circuits 60 are each supplied with clock signals CK1 to CK4, and each receive a voltage VGL. The selection circuits 60 output, from respective output terminals Q to respective scanning lines G (G(1) to G(1280)), scanning signals at respective time points shifted from one another.

The first selection circuit 60 (60(1)) receives, at a set terminal S thereof, a start pulse GSP1 as the above start pulse, and the second selection circuit 60 (60(2)) receives, at a set terminal S thereof, a start pulse GSP2 as the above start pulse. The selection circuits 60 at the third and subsequent odd-numbered stages each receive, at a set terminal S thereof, a scanning signal outputted from the selection circuit 60 two stages before. The selection circuits 60 at the fourth and subsequent even-numbered stages each receive, at a set terminal S thereof, a scanning signal outputted from the selection circuit 60 two stages before.

The selection circuit 60 (60(1278)) at the third stage from the last receives, at a reset terminal R thereof, a clear signal CLR1. The selection circuit 60 (60(1279)) at the second stage from the last receives, at a reset terminal R thereof, a clear signal CLR2. The selection circuit 60 (60(1280)) at the last stage receives, at a reset terminal R thereof, a clear signal CLR3. The selection circuits 60 other than the last three selection circuits 60 (60(1278) to 60(1280)) each receive, at a reset terminal R thereof, a scanning signal outputted from the selection circuit 60 three stages after. The clear signals CLR1 to CLR3 are used for, when the selection of all the scanning lines G ends, initialization for allowing the scanning lines G to be selected again from the first scanning line G.

The clock signals CK1 to CK4, the voltage VGL, the start pulses GSP1 and GSP2, and the clear signals CLR1 to CLR3 all described above are supplied from the control circuit 3. A mask signal SigX described later is also supplied from the control circuit 3.

One or more of the clock signals CK1 to CK4 may be unused depending on the configuration of the selection circuits 60.

As illustrated in (a) of FIG. 4, the start pulses GSP1 and GSP2 are each a single pulse and share an equal pulse width. The start pulse GSP2 has a phase that is delayed from the phase of the start pulse GSP1 by half the pulse width.

The clock signals CK1 to CK4 each have (i) a pulse width equal to the pulse width of the start pulses GSP1 and GSP2 and (ii) a duty ratio of 50%. The clock signal CK1 has a phase that is delayed from the phase of the start pulse GSP2 by half the pulse width. The clock signal CK2 has a phase that is delayed from the phase of the clock signal CK1 by half the pulse width. The clock signal CK3 has a phase that is delayed from the phase of the clock signal CK2 by half the pulse width. The clock signal CK4 has a phase that is delayed from the phase of the clock signal CK3 by half the pulse width.

As illustrated in (b) of FIG. 4, the clear signals CLR1 to CLR3 are each a single pulse and each have a pulse width equal to the pulse width of the start pulses GSP1 and GSP2. The clear signal CLR1 has a phase that is delayed from the last clock pulse of the clock signal CK4 by half the pulse width. The clear signal CLR2 has a phase that is delayed from the clear signal CLR1 by half the pulse width. The clear signal CLR3 has a phase that is delayed from the clear signal CLR2 by half the pulse width.

The description below deals with the configuration of each selection circuit 60. FIG. 5 is a circuit diagram illustrating the configuration of a selection circuit 60.

As illustrated in FIG. 5, the selection circuit 60 includes transistors T1 to T4 and an electric potential controlling circuit 61. The transistors T1 to T4 are each a thin film transistor.

The transistor T1 (output transistor) has (i) a gate connected to a node Na and (ii) a source connected to a scanning line G. The transistor T1 receives a clock signal CK1 at a drain thereof. The transistor T4 (electric potential controlling transistor) has a drain connected to the node Na. The transistor T4 has a source to which the voltage VGL is being applied.

The transistor T2 receives a set signal Set at a gate and source thereof. The transistor T2 has a drain connected to the node Na. The transistor T3 receives a reset signal Reset at a gate thereof. The transistor T3 has a drain connected to the node Na. The transistor T3 has a source to which the voltage VGL is being applied.

The electric potential controlling circuit 61 controls the electric potential of the gate (control terminal) of the transistor T4. The electric potential controlling circuit 61 includes transistors T5, T6, and Tx. The transistors T5, T6, and Tx are each a thin film transistor.

The transistor T5 (first high electric potential controlling circuit) receives a clock signal CK4 at a gate and source thereof. The transistor T5 has a drain connected to a node Nb, that is, the gate of the transistor T4. The transistor T6 has (i) a gate connected to the node Na and (ii) a drain connected to the node Nb. The transistor T6 has a source to which the voltage VGL is being applied. The transistor Tx (second high electric potential controlling circuit) receives a mask signal SigX (first control signal) at a gate and source thereof. The transistor Tx has a drain connected to the node Nb.

The description below deals with how the selection circuit 60 configured as above operates. FIG. 6 is a timing chart illustrating how the selection circuit 60 operates for normal scanning.

As illustrated in FIG. 6, the level of the set signal Set changing from low to high causes the electric potential of the node Na to rise. This causes the transistor T1 to be turned on, thereby allowing a single clock pulse of the clock signal CK1 to be outputted via the transistor T1 to the corresponding scanning line G as a scanning signal. After the level of the set signal has changed from high to low, the level of the reset signal Reset changing from low to high causes the electric potential of the node Na to fall.

The level of the clock signal CK1 changing from low to high would normally cause the electric potential of the node Na to rise through a parasitic capacitance Cp formed between the drain and gate of the transistor T1. However, when the level of the clock signal CK1 changes from low to high, the transistor T5 is on as a result of the high level of the clock signal CK4, and thus the transistor T4 is on. This causes the electric potential of the node Na to be stabilized to the voltage VGL (Lo electric potential [low electric potential]).

While the electric potential of the node Na has a raised level (after the set signal Set changes from low to high), the transistor T6 is on, and thus the electric potential of the node Nb is kept at a low level. Thus, during this period, even in a case where the level of the clock signal CK4 changing to high has caused the transistor T5 to be turned on, the electric potential of the node Nb is kept at a low level. Thus, the transistor T4 being kept off allows the node Na to keep a raised electric potential.

Displaying an image involves a frequency of 60 Hz, while the touch panel 41 requires an operating frequency of 120 Hz for a detection process. This indicates that using a vertical blanking period alone does not allow the touch panel 41 to carry out a detection process. This makes it necessary to, during the period of the display section 4 carrying out a display operation, pause the display operation and cause the touch panel 41 to carry out a detection process. During such a pause, it is impossible to keep the electric potential of the node Na in the selection circuit 60 for an extended time period. Thus, each pause is short.

FIG. 7 illustrates how periods of display operation and periods of pause of the display operation are allocated for a selection circuit 60 during a single frame. A touch panel processing circuit (not shown) obtains data on detection by the touch panel 41 during each of the nine pause periods and one vertical blanking period (ten periods in total) as illustrated in FIG. 7, integrates each of (i) detection data for the first five periods and (ii) detection data for the second five periods, and outputs two sets (120 Hz) of data on touches during a single frame.

The description below deals with how a selection circuit 60 operates after the operation is paused during a single frame as described above. FIG. 8 is a timing chart illustrating an operation of a selection circuit 60 which operation includes a pause period Ti.

As illustrated in FIG. 8, during the pause period Ti, during which the selection circuit 60 pauses its operation, the supply of the clock signals CK1 to CK4 is stopped, and thus the output of scanning signals to the scanning lines G is stopped. Immediately after the pause period Ti ends, the supply of the clock signals CK1 to CK4 is restarted sequentially. However, at the time point at which the level of the clock signal CK1 changes from low to high (that is, the clock signal CK1 rises), the clock signal CK4 has a low level. This would normally cause the electric potential of the node Na to rise due to the parasitic capacitance Cp.

In view of that, the level of the mask signal SigX changes from low to high during the pause period Ti, which precedes the time point at which the clock signal CK1 rises. Thus, at the time point at which the clock signal CK1 rises, the transistor Tx is already on. This causes the transistor T4 to be turned on, and thus the electric potential of the node Na is stabilized to a Lo electric potential defined by the voltage VGL (first period TP1).

The mask signal SigX may be a pulse signal having a pulse width equal (that is, a shape identical) to that of the clock signal CK4. The mask signal SigX is, however, not limited to such a pulse signal. The mask signal SigX simply needs to have a high level at the time point at which the first clock pulse of the clock signal CK1 rises of which clock signal CK1 the supply is restarted immediately after the pause period Ti ends.

Then, after the output of the clock signal CK4 has restarted, the clock signal CK4, as described above, has a high level at the time point at which the clock signal CK1 rises. This causes the transistors T5 and T4 to be turned on and thus the electric potential of the node Na to be stabilized to the Lo electric potential (second period TP2). This indicates that the mask signal SigX needs to be supplied to the selection circuit 60 only when the first clock pulse of the clock signal CK1 is inputted into the selection circuit 60 immediately after the pause period Ti ends.

In a case where the pause period Ti is long, the electric potential of the node Na or Nb may be changed from the electric potential that the node Na or Nb should have. For instance, during a pause period Ti during which the node Na is not set (Lo electric potential), the electric potential of the node Na may rise from the Lo electric potential. Restarting the scanning operation in such a state may more likely let a change in the electric potential of the clock signal CK1 induce the gate driving circuit 6 to malfunction. Examples of such malfunction include (i) a plurality of pulse signals being outputted into a scanning line G and (ii) the Lo electric potential of a scanning line G rising (that is, increasing over a desired value) with the result of a signal being written erroneously.

Variation 1

The following description will discuss Variation 1 of the present embodiment.

FIG. 9 is a circuit diagram illustrating the configuration of a selection circuit 60A of the present variation.

As illustrated in FIG. 9, the selection circuit 60A of the present variation includes transistors T1 to T4 as well as a transistor T7 and a capacitor element C1. The selection circuit 60A includes an electric potential controlling circuit 62 in place of the electric potential controlling circuit 61 described above. The selection circuit 60A replaces each selection circuit 60 illustrated in (a) and (b) of FIG. 3 to be included in the gate driving circuit 6.

The transistor T7 has (i) a drain connected to a scanning line G, (ii) a source to which the voltage VGL is being applied, and (iii) a gate into which the clock signal CK3 is inputted. The capacitor element C1 is connected to the gate and source of the transistor T1.

Similarly to the electric potential controlling circuit 61, the electric potential controlling circuit 62 controls the electric potential of the gate of the transistor T4. The electric potential controlling circuit 62 includes transistors T5, T6, and Tx. The electric potential controlling circuit 62 also includes a transistor T8. The transistors T7 and T8 are each a thin film transistor.

The transistor T8 has (i) a drain connected to the node Nb, (ii) a source to which the voltage VGL is being applied, and (iii) a gate into which the clock signal CK2 is inputted.

The selection circuit 60A configured as above causes the transistor T7 to stabilize the electric potential of the scanning line G to the Lo electric potential each time the level of the clock signal CK3 becomes high. Further, the capacitor element C1 increases the capacitance of the node Na. This stabilizes the electric potential of the node Na. In a case where the electric potential of the node Na can be stabilized sufficiently with use of the parasitic capacitance Cp of the transistor T1, the capacitor element C1 is unnecessary. The transistor T8 returns the electric potential of the node Nb to the Lo electric potential each time the level of the clock signal CK2 becomes high, and thereby reduces degradation (threshold shift) of the transistor T4.

As described above, the selection circuit 60A of the present variation, which includes transistors T7 and T8 and a capacitor element C1, is preferable in terms of stabilizing the operation. It is needless to say, however, that the above object of the present invention is also attainable without use of those elements, as with the selection circuit 60 of the present embodiment.

Variation 2

The following description will discuss Variation 2 of the present embodiment.

(a) to (e) of FIG. 10 are each a circuit diagram illustrating the configuration of a modified portion of the electric potential controlling circuit 61 or 62 in the selection circuit 60 or 60A in accordance with the present variation.

The present variation concerns example modifications to different portions of the electric potential controlling circuit 61 in the selection circuit 60 and the electric potential controlling circuit 62 in the selection circuit 60A.

(a) of FIG. 10 illustrates a configuration in which in the electric potential controlling circuit 61, the transistor Tx has, instead of a source into which the mask signal SigX is inputted, a source to which a power supply voltage VDD (that is, a DC signal at a high level) is applied.

(b) of FIG. 10 illustrates a configuration in which in the electric potential controlling circuit 62, (i) the transistor T5 has, instead of a gate and a source into both of which the clock signal CK4 is inputted, a gate and a source into which the clock signal CK1 is inputted, and (ii) the transistor T8 has, instead of a gate into which the clock signal CK2 is inputted, a gate into which the clock signal CK3 is inputted.

(c) of FIG. 10 illustrates a configuration in which in the electric potential controlling circuit 61, the transistor T5 has a gate into which the clock signal CK1 or clock signal CK4 is inputted and a source to which the power supply voltage VDD is applied.

(d) of FIG. 10 illustrates a configuration in which in the electric potential controlling circuit 62, the transistors T5 and T8 are replaced with a capacitor element CAP. The capacitor element CAP has a first terminal into which the clock signal CK1 or clock signal CK4 is inputted and a second terminal connected to the node Nb.

(e) of FIG. 10 illustrates a configuration in which in the electric potential controlling circuit 61, (i) the transistor T5 is replaced with transistors T5a and T5b, and (ii) the transistor T6 is replaced with transistors T6a and T6b. The transistor T5a has a gate and source into which the clock signal CK1 or clock signal CK4 is inputted. The transistor T5b has a source into which the clock signal CK1 or clock signal CK4 is inputted. The transistor T5b has a gate connected to the drain of the transistor T5a.

The transistors T6a and T6b each have a gate connected to the node Na. The transistors T6a and T6b each have a source to which the voltage VGL is being applied. The transistor T6a has a drain connected to the drain of the transistor T5a. The transistor T6b has a drain connected to the node Nb.

Embodiment 2

The following description will discuss Embodiment 2 of the present invention with reference to FIGS. 3, 4, and 11 to 13. For convenience of explanation, any element of the present embodiment that is identical in function to an element described for Embodiment 1 is assigned the same reference sign. Such an element is not described again here.

While Embodiment 1 involves a mask signal SigX being inputted into the gate of the transistor Tx in the electric potential controlling circuit 61 or 62, the present embodiment involves, as an example, another signal in place of the mask signal SigX.

FIG. 11 is a circuit diagram illustrating the configuration of a modified portion of an electric potential controlling circuit in a selection circuit of the present embodiment. FIG. 12 is a circuit diagram illustrating the configuration of a selection circuit 60B of Embodiment 2. FIG. 13 is a timing chart illustrating how the selection circuit 60B operates.

The mask signal SigX is replaced with one of the clear signals CLR1 to CLR3 illustrated in (b) of FIG. 4. As illustrated in (a) and (b) of FIG. 4, the clear signals CLR1 to CLR3 (second control signal) for Embodiment 1 are used only to cause the node Na of each of the selection circuits 60(1278) to 60(1280) to have a Lo electric potential. In view of that, in a case where the clear signals CLR1 to CLR3 have been changed so as to each rise to a Hi electric potential at the same time point as the mask signal SigX in FIG. 8, the clear signals CLR1 to CLR3 may be used to cause the transistors Tx and T4 to be turned on and thus the electric potential of the node Na to be stabilized to the Lo electric potential.

The selection circuits 60 and 61A each include a transistor Ty (electric potential stabilizing transistor) as illustrated in FIG. 11. The transistor Ty has (i) a drain connected to a scanning line G, (ii) a source to which the voltage VGL is being applied, and (iii) a gate to which a voltage VTP1 (second control signal) is being applied. The transistor Ty serves to stabilize the electric potential of the corresponding scanning line G during a pause period Ti. The voltage VTP1, similarly to the mask signal SigX, becomes high during a pause period Ti preceding the rise of the clock signal CK1. The voltage VTP1 is thus used in place of the mask signal SigX.

The gate driving circuit 6 of the present embodiment includes selection circuits 60B illustrated in FIG. 12 in place of selection circuits 60A (see FIG. 9). As illustrated in FIG. 12, the selection circuits 60B, as with the selection circuits 60A, each include transistors T1 to T4 and an electric potential controlling circuit 62. The selection circuit 60B also includes an electric charge supplying circuit 63 (high electric potential retaining circuit).

The electric charge supplying circuit 63 includes transistors T9 to T12, which are each a thin film transistor.

The transistor T9 receives a set signal S at a gate and source thereof. The transistor T9 has a drain connected to a node Nc. The transistor T10 has (i) a gate connected to the node Nb, (ii) a drain connected to the node Nc, and (iii) a source to which the voltage VGL is being applied.

The transistor T11 has a source to which a voltage VTP2 (second control signal) is being applied. The transistor T12 has a gate to which the voltage VTP2 is being applied. The transistor T11 has a gate connected to the node Nc. The transistor T11 has a drain connected to the drain of the transistor T12. The transistor T12 has a source connected to the node Na.

The electric charge supplying circuit 63 serves to retain the electric potential of the node Na at a high level during the pause period Ti. As illustrated in FIG. 13, the voltage VTP2 rises from low to high at the start of the pause period Ti and falls from high to low at the end of the pause period Ti, at which the clock signal CK1 rises. Such a voltage VTP2 may be used in place of the mask signal SigX. In a case where the selection circuits 60B are each configured to include a transistor Ty, the voltages VTP1 and VTP2 may be used in combination.

The voltage VTP2 may change from high to low before the end of the pause period Ti. Even in a case where the voltage VTP2 changes from high to low before the end of the pause period Ti, the electric potential of the node Nb is retained at a high level. Further, no element will change the electric potential of the node Nb to a low level after the voltage VTP2 changes from high to low and before the clock signal CK1 rises. This indicates that even in the case where the voltage VTP2 changes from high to low before the end of the pause period Ti, it is possible to produce an effect equivalent to the effect produced in the case where the mask signal SigX is used.

In a case where after the voltage VTP2 changes from high to low, the electric charge retained by the node Nb has been leaked so that the electric potential of the node Nb has been lowered to be close to the voltage VGL, it will be difficult to curb the influenced by the clock signal CK1. It is thus preferable to use a signal, such as the mask signal SigX of Embodiment 1, that allows the electric potential of the node Nb to be maintained at a high level around the time point at which the clock signal CK1 rises.

As described above, the present embodiment uses, in place of the mask signal SigX, another signal or voltage. This configuration eliminates the need to generate a dedicated mask signal SigX and thereby reduces the number of signals to be used.

Embodiment 3

The following description will discuss Embodiment 3 of the present invention with reference to FIG. 14. For convenience of explanation, any element of the present embodiment that is identical in function to an element described for Embodiment 1 is assigned the same reference sign. Such an element is not described again here.

FIG. 14 is a circuit diagram illustrating the configuration of a selection circuit 60C of the present embodiment.

As illustrated in FIG. 14, the selection circuit 60C includes transistors T1, T4, T2a, T2b, T3a, T3b, and T21 to T23 and an electric potential controlling circuit 61. The transistors T2a, T2b, T3a, T3b, and T21 to T23 are each a thin film transistor.

The transistor T2a receives a set signal Set at a gate and source thereof. The transistor T2a has a drain connected to a node Nd. The transistor T3a has a drain connected to the node Nd. The transistor T3a receives a reset signal Reset at a gate thereof. The transistor T3a has a source to which the voltage VGL is being applied.

The transistor T2b (first electric potential switching transistor) has (i) a gate connected to the node Nd, (ii) a drain connected to a node Na, and (iii) a source connected to a node Ne. The transistor T3b (second electric potential switching transistor) receives a reset signal Reset at a gate thereof. The transistor T3b has a drain connected to the node Na and a source to which the voltage VGL is being applied.

The transistor T21 has (i) a gate connected to the node Nb, (ii) a drain connected to the node Nd, and (iii) a source to which the voltage VGL is being applied.

The transistor T22 receives a set signal Set at a gate and source thereof. The transistor T22 has a drain connected to the node Ne. The transistor T23 receives a restart signal Sig_restart at a gate and source thereof. The transistor T23 has a drain connected to the node Ne.

The selection circuits 60 of Embodiment 1 are each configured such that in a case where the node Na has retained a Hi electric potential (high electric potential) due to a set signal Set during the pause period Ti, the properties of the transistor T1 change so that the transistor T1 will have a higher threshold (that is, no current will flow). This might cause the corresponding scanning line G to have an output waveform different from the output waveform of a scanning line G connected to another selection circuit 60, with the result of a lateral noise line being visible in a displayed image.

In view of that, the selection circuits 60C are each configured such that the electric charge is retained by not the node Na but the node Nd. Although this configuration lets the properties of the transistor T2b change, since the transistor T2b does not output a scanning signal into a scanning line G, the change in the properties has only a small influence on the display.

The selection circuits 60C are each configured such that the level of the restart signal Sig_restart becoming high at the end of the pause period Ti causes a scanning operation to restart. The level of the restart signal Sig_restart changing from low to high causes a parasitic capacitance Cp to be formed between the gate and source of the transistor T2b, which then causes the electric potential of the node Nd to rise. This causes the transistor T2b to be turned on and thus the restart signal Sig_restart at a high level to be transmitted to the node Na via the transistor T2b. This causes the transistor T1 to be turned on, which would let the clock signal CK1 be outputted into the corresponding scanning line G, thereby possibly causing an influence on a displayed image or causing the gate driving circuit 6 to malfunction. To avoid such a disadvantage, the selection circuits 60C each include a transistor T21.

The transistor Tx in the electric potential controlling circuit 61 becomes turned on by a mask signal SigX, which becomes high before the end of the pause period Ti. The electric potential of the node Nb becomes high as a result. Thus, the transistor T21 becoming turned on causes the electric potential of the node Nd to be stabilized to the voltage VGL, thereby causing the transistor T2b to be turned off. This prevents the restart signal Sig_restart at a high level from being transmitted to the node Na via the transistor T2b.

For the selection circuits 60 and 60A of Embodiment 1, it is the clock signal CK1 that is a noise source for the operation of the transistor T1, and it is the node Na that is influenced by the noise of the clock signal CK1. In contrast, for the selection circuits 60C of the present embodiment, it is the restart signal Sig_restart that is a noise source for the operation of the transistor T1, and it is the node Nd that is influenced by the noise of the restart signal Sig_restart.

The present embodiment is configured such that the respective gates of the transistors T4 and T21 are connected to the electric potential controlling circuit 61. The present invention is, however, not limited to such a configuration. The present embodiment may alternatively be configured, for instance, to include an electric potential controlling circuit equivalent in function to the electric potential controlling circuit 61 such that the gate of the transistor T21 is connected to that electric potential controlling circuit.

The configuration of the present embodiment is applicable to not only Embodiment 1 (including Variations 1 and 2), but also Embodiment 2.

[Recap]

A display driving device in accordance with a first aspect of the present invention includes a plurality of selection circuits (selection circuits 60 and 60A to 60C) each provided for a corresponding one of a plurality of scanning lines in such a manner as to, as a scanning signal for selecting the corresponding one of the plurality of scanning lines so as to allow a pixel signal to be supplied to a corresponding one of a plurality of pixels connected to the corresponding one of the plurality of scanning lines, select a single clock pulse of a clock signal and output the clock pulse, the selection circuits each including: an output transistor (transistor T1) configured to output the scanning signal; an electric potential controlling transistor (transistor T2) configured to control an electric potential of a control terminal of the output transistor so that the electric potential of the control terminal of the output transistor is at a low level; a first high electric potential controlling circuit (transistor T5) configured to, while the output transistor is not outputting the scanning signal, control an electric potential of a control terminal of the electric potential controlling transistor so that the electric potential of the control terminal of the electric potential controlling transistor is at a high level; and a second high electric potential controlling circuit (transistor Tx) configured to, while the first high electric potential controlling circuit is not in operation during a pause period Ti during which an operation of the selection circuit is paused, control the electric potential of the control terminal of the electric potential controlling transistor so that the electric potential of the control terminal of the electric potential controlling transistor becomes high.

With the above configuration, when the selection circuit has restarted operating after the pause period ends, the electric potential of the control terminal of the output transistor would rise due to the parasitic capacitance of the output transistor. At this stage, before the first high electric potential controlling circuit starts operating, the second high electric potential controlling circuit controls the electric potential of the control terminal of the electric potential controlling transistor so that the electric potential of the control terminal of the electric potential controlling transistor is at a high level. This causes the electric potential controlling transistor to be turned on. This in turn allows the electric potential of the output transistor to be stabilized to a low electric potential. The above configuration thereby prevents the output transistor from erroneously outputting a first clock signal as a scanning signal.

A display driving device in accordance with a second aspect of the present invention is configured as in the first aspect and may be further configured such that the second high electric potential controlling circuit is configured to, after the pause period Ti, continue to control the electric potential of the control terminal of the electric potential controlling transistor so that the electric potential of the control terminal of the electric potential controlling transistor is at a high level.

The above configuration allows the electric potential of the control terminal of the electric potential controlling transistor to be reliably maintained at a high level even after the first high electric potential controlling circuit starts operating after the pause period.

A display driving device in accordance with a third aspect of the present invention is configured as in the first or second aspect and may be further configured such that the second high electric potential controlling circuit is a transistor.

The above configuration allows the electric potential maintaining circuit to be simplified in configuration.

A display driving device in accordance with a fourth aspect of the present invention is configured as in the third aspect and may be further configured such that the transistor as the second high electric potential controlling circuit is turned on with use of a first control signal; and the first control signal doubles as a second control signal for controlling an element of the selection circuit which element is other than the transistor as the second high electric potential controlling circuit.

The above configuration eliminates the need to generate a dedicated first control signal and thereby reduces the number of control signals to be used.

A display driving device in accordance with a fifth aspect of the present invention is configured as in the fourth aspect and may be further configured such that the second control signal is a clear signal for, when selection of the plurality of scanning lines ends, controlling, for initialization intended to allow the plurality of scanning lines to be selected again, the electric potential of the control terminal of the output transistor so that the electric potential of the control terminal of the output transistor is at a low level.

A display driving device in accordance with a sixth aspect of the present invention is configured as in the fourth aspect and may be further configured such that the second control signal is a signal for controlling an electric potential stabilizing transistor for stabilizing an electric potential of the corresponding one of the plurality of scanning lines during the pause period Ti.

A display driving device in accordance with a seventh aspect of the present invention is configured as in the fourth aspect and may be further configured such that the second control signal is a signal for controlling a high electric potential retaining circuit configured to retain the electric potential of the control terminal of the electric potential controlling transistor at a high level during the pause period Ti.

A display driving device in accordance with an eighth aspect of the present invention is configured as in any of the first to seventh aspects and may be further configured such that the selection circuits each further include: an electric potential switching transistor (transistor T2b) configured to switch the electric potential of the control terminal of the output transistor to a high level; and a low electric potential controlling transistor (transistor T21) configured to, in a case where the low electric potential controlling transistor is on, control an electric potential of a control terminal of the electric potential switching transistor so that the electric potential of the control terminal of the electric potential switching transistor is at a low level.

With the above configuration, in a case where the control terminal of the output transistor has retained a high electric potential during the pause period, the properties of the output transistor change so that the output transistor will have a higher threshold. This might cause the corresponding scanning line to have an output waveform different from the output waveform of a scanning line connected to another selection circuit, with the result of a lateral noise line being visible in a displayed image. In view of that, the selection circuits are each configured such that the electric charge is retained by a node different from the control terminal of the output transistor, that is, the control terminal of the electric potential switching transistor.

The selection circuits are each configured to restart its scanning operation in response to a Hi signal inputted into the electric potential switching transistor. When the signal inputted into the electric potential switching transistor has changed from a Lo signal to a Hi signal, the electric potential of the control terminal of the electric potential switching transistor rises due to a parasitic capacitance between the control terminal and input terminal of the electric potential switching transistor. This causes (i) the electric potential switching transistor to be turned on and thus (ii) a Hi signal to be transmitted to the control terminal of the output transistor via the electric potential switching transistor. This causes the output transistor to be turned on, which might let a clock signal be outputted into the corresponding scanning line, thereby possibly causing an influence on a displayed image or causing the display driving device to malfunction. To avoid such a disadvantage, the selection circuits each include a low electric potential controlling transistor.

A display driving device in accordance with a ninth aspect of the present invention is configured as in the eighth aspect and may be further configured such that the low electric potential controlling transistor has a control terminal connected to the control terminal of the electric potential controlling transistor.

With the above configuration, in a case where the second high electric potential controlling circuit has controlled the electric potential of the control terminal of the electric potential controlling transistor so that the electric potential of the control terminal of the electric potential controlling transistor is at a high level, the electric potential of the control terminal of the low electric potential controlling transistor becomes high as well. This causes the low electric potential controlling transistor to be turned on, which in turn makes it possible to control the electric potential of the control terminal of the electric potential switching transistor so that the electric potential of the control terminal of the electric potential switching transistor is at a low level.

A display driving device in accordance with a tenth aspect of the present invention is configured as in the eighth or ninth aspect and may be further configured such that the electric potential switching transistor is configured to, when the selection circuit restarts operating after the pause period Ti, switch the electric potential of the control terminal of the output transistor to the high level.

A display device in accordance with an eleventh aspect of the present invention includes: a display driving device according to any of the first to seventh aspects; a pixel signal supplying device (source driving circuit 5) configured to supply the pixel signal to the corresponding one of the plurality of pixels connected to the corresponding one of the plurality of scanning lines which corresponding one of the plurality of scanning lines has been selected by the display driving device; and a display section 4 including the plurality of pixels.

[Supplemental Notes]

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST

4 Display section
5 Source driving circuit (pixel signal supplying device)
6 gate driving circuit (display driving device)
60, 60A to 60C Selection circuit
63 Electric charge supplying circuit (high electric potential retaining circuit)
100 Liquid crystal display device (display device)
CK1 Clock signal
CLR1 to CLR3 Clear signal (second control signal)
G Scanning line
P Pixel
SigX Mask signal (first control signal)
T1 Transistor (output transistor)
T2*b* Transistor (electric potential switching transistor)
T4 Transistor (electric potential controlling transistor)
T5 Transistor (first high electric potential controlling circuit)
T21 Transistor (low electric potential controlling transistor)
Tx Transistor (second high electric potential controlling circuit)
Ty Transistor (electric potential stabilizing transistor)
Ti Pause period
VTP1, VTP2 Voltage (second control signal)

The invention claimed is:

1. A display driving device, comprising:
a plurality of selection circuits each provided for a corresponding one of a plurality of scanning lines in such a manner as to, as a scanning signal for selecting the corresponding one of the plurality of scanning lines so as to allow a pixel signal to be supplied to a corresponding one of a plurality of pixels connected to the corresponding one of the plurality of scanning lines, select a single clock pulse of a clock signal and output the single clock pulse,
each selection circuit of the plurality of selection circuits comprises:
an output transistor configured to output the scanning signal;
an electric potential controlling transistor configured to control an electric potential of a control terminal of the output transistor so that the electric potential of the control terminal of the output transistor is at a low level;
a first high electric potential controlling circuit configured to, while the output transistor is not outputting the scanning signal, control an electric potential of a control terminal of the electric potential controlling transistor so that the electric potential of the control terminal of the electric potential controlling transistor is at a high level; and
a second high electric potential controlling circuit configured to, while the first high electric potential controlling circuit is not in operation during a pause period during which an operation of the selection circuit is paused, control the electric potential of the control terminal of the electric potential controlling transistor so that the electric potential of the control terminal of the electric potential controlling transistor becomes high,
wherein the second high electric potential controlling circuit is configured to, after the pause period, continue to control the electric potential of the control terminal of the electric potential controlling transistor so that the electric potential of the control terminal of the electric potential controlling transistor is at a high level.

2. The display driving device according to claim 1, wherein
the second high electric potential controlling circuit is a transistor.

3. The display driving device according to claim 2, wherein
the transistor as the second high electric potential controlling circuit is turned on with use of a first control signal; and
the first control signal doubles as a clear signal for, when selection of the plurality of scanning lines ends, controlling, for initialization intended to allow the plurality of scanning lines to be selected again, the electric potential of the control terminal of the output transistor so that the electric potential of the control terminal of the output transistor is at a low level.

4. The display driving device according to claim 2, wherein
each selection circuit of the plurality of selection circuits each further comprises electric potential stabilizing transistor for stabilizing an electric potential of the corresponding one of the plurality of scanning lines during the pause period,
the transistor as the second high electric potential controlling circuit is turned on with use of a first control signal; and
the first control signal doubles as a signal for controlling the electric potential stabilizing transistor.

5. The display driving device according to claim 2, wherein
each selection circuit of the plurality of selection circuits each further comprises high electric potential retaining circuit configured to retain the electric potential of the control terminal of the output transistor at a high level during the pause period,
the transistor as the second high electric potential controlling circuit is turned on with use of a first control signal; and
the first control signal doubles as a signal for controlling the high electric retaining circuit.

6. The display driving device according to claim 1, wherein
each selection circuit of the plurality of selection circuits further comprises:
an electric potential switching transistor configured to switch the electric potential of the control terminal of the output transistor to a high level; and
a low electric potential controlling transistor configured to, in a case where the low electric potential controlling transistor is on, control an electric potential of a control terminal of the electric potential switching transistor so that the electric potential of the control terminal of the electric potential switching transistor is at a low level.

7. The display driving device according to claim 6, wherein
the low electric potential controlling transistor has a control terminal connected to the control terminal of the electric potential controlling transistor.

8. The display driving device according to claim 6, wherein
the electric potential switching transistor is configured to, when the selection circuit restarts operating after the pause period, switch the electric potential of the control terminal of the output transistor to the high level.

9. A display device, comprising:
a display driving device according to claim 1;
a pixel signal supplying device configured to supply the pixel signal to a corresponding one of the plurality of pixels connected to the corresponding one of the plurality of scanning lines, wherein the corresponding one of the plurality of scanning lines has been selected by the display driving device; and
a display section including the plurality of pixels.

* * * * *